Mol $CaO/P_2O_5 = 1.7$
- Kouribgha, mol $F/P_2O_5 = 0.82$
× Kola, mol $F/P_2O_5 = 0.63$
○ Florida pebble, mol $F/P_2O_5 = 0.83$
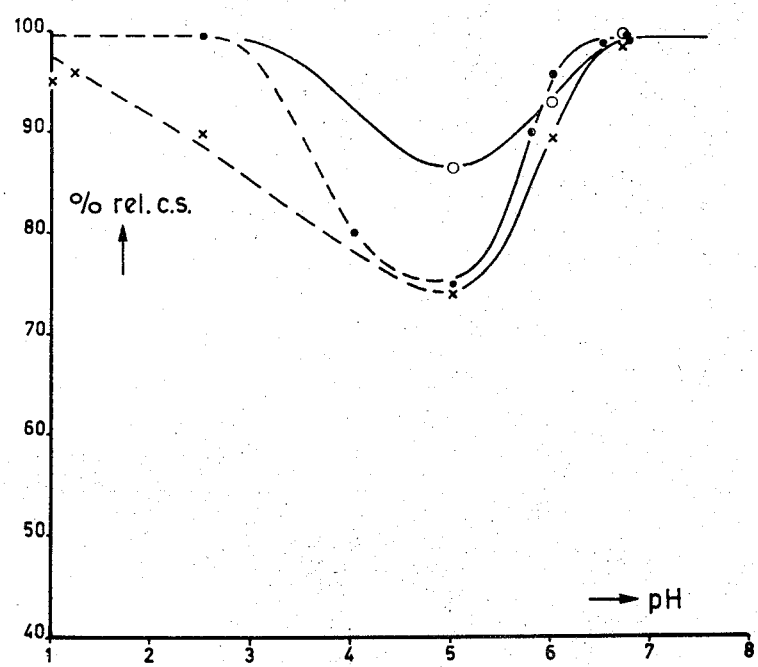

United States Patent Office 2,948,602
Patented Aug. 9, 1960

2,948,602
PRODUCTION OF PHOSPHATE FERTILIZERS AND RESULTANT PRODUCT

Leonardus J. Revallier and Willem Slot, both of Geleen, Netherlands, assignors to Stamicarbon N.V., Heerlen, Netherlands Filed Mar. 1, 1957, Ser. No. 643,267

Claims priority, application Netherlands Mar. 2, 1956

3 Claims. (Cl. 71—39)

In British Patent No. 430,380, there is disclosed a process for the production of a mixed fertilizer containing nitrogen, calcium and phosphate. According to that patent, the raw phosphate is decomposed with nitric acid, or a mixture of nitric acid and another strong acid such as phosphoric acid, and the acid decomposition liquor is continuously neutralized with $NH_3$ at a constant pH by introducing such quantities thereof together with $NH_3$ into a reservoir filled with a portion of an ammonia-treated, neutral-to-slightly acid solution obtained from a previous decomposition process, that the reaction mixture contained in the reservoir and continuously flowing therefrom is constantly in a neutral-to-slightly acid condition; in other words, its pH does not substantially surpass the limits 6 to 4. Following this neutralization step, the neutralized mixture is further evaporated to yield a melt, which is granulated by spraying and finally dried.

Applicants have now found that in processing raw phosphates containing fluorine, the procedure outlined above will yield fertilizers the phosphate of which is almost completely soluble in ammonium citrate, only if said continuous neutralization is effected at the neutral point, i.e. if the pH is constantly maintained during neutralization at 6.0 to 7.5.

The graphs illustrated in the accompanying drawing show the relation between the ammonium citrate-solubility of the phosphate precipitated during neutralization and the pH maintained in the reservoir during partial or complete neutralization for three fluorine-containing phosphates of quite different origin, namely Florida pebble phosphate, Kouribgha phosphate and Kola phosphate. From these graphs, it is apparent that, in order to achieve almost complete ammonium citrate-solubility of the products obtained from these fluorine-containing phosphates, the neutralization must be carried out either in a strongly acidic or in a perfectly neutral medium.

In addition, it was found that during the further processing of the neutralized decomposition liquor into a granulated fertilizer, considerable losses of $NH_3$ are incurred, particularly during evaporation, which losses amount to more than 10% of the quantity of $NH_3$ added during neutralization.

Applicants have discovered that these $NH_3$ losses can be avoided in a simple manner by adding to the solution which has been continuously neutralized at the neutral point, sufficient acid to bring the pH to a value of approximately 4—by which is meant a pH value of from 3 to 4.5—thereafter, the solution can be further evaporated, granulated and dried.

The said addition of acid does not appreciably lower the ammonium citrate-solubility of the phosphate, and on the other hand, $NH_3$ is no longer set free during evaporation, granulation and drying.

However, if the fluorine-containing decomposition liquor is neutralized at a pH of approximately 4 and then evaporated, then, there is no loss of $NH_3$, but neither does the phosphate become completely soluble in ammonium citrate. The loss of ammonia incurred when omitting the measures according to the invention can be explained on the assumption that, during evaporation of the neutralized decomposition liquor, the water-soluble ammonium phosphate present in the liquor decomposes into water-soluble monoammonium phosphate.

By X-ray examination and analysis of the calcium phosphates formed during neutralization, it has been found that if the fluorine-containing decomposition liquor, after having been adjusted to a molar $CaO/P_2O_5$ ratio of $\leq 2$ in the usual manner—e.g. by crystallization and separation of calcium nitrate, or by addition of phosphoric acid—is continuously neutralized with $NH_3$ at a pH of 6.0 or higher, dicalcium phosphate is not precipitated, but a citrate-soluble compound resembling apatite, which contains considerably less $P_2O_5$ per mole CaO than dicalcium phosphate. As a consequence, the solution contains a quantity of $P_2O_5$ which cannot combine with CaO and, on neutralization in a neutral medium, is converted into diammonium phosphate. At the fairly high temperatures at which evaporation takes place, namely 120° to 145° C., this diammonium phosphate is unstable and changes, with evolution of $NH_3$, into monoammonium phosphate which is stable at said temperatures.

The above reactions may be represented by the following equations, assuming that the raw phosphate used corresponds to the formula $Ca_{10}(PO_4)_6F_2$, and that the calcium phosphate precipitated during neutralization—after subtraction of $CaF_2$—shows a $CaO/P_2O_5$ ratio of 2.65.

DECOMPOSITION

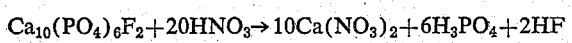

$5Ca(NO_3)_2$ is removed by cooling, after which the mixture is neutralized with $NH_3$ according to the equation:

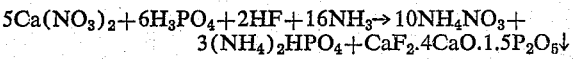

Direct evaporation, granulation and drying of this mixture will entail a loss of $NH_3$ according to the equation:

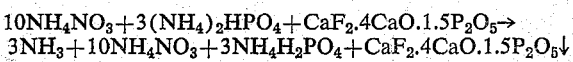

According to the invention, the citrate-solubility of the calcium phosphate is not impaired if, prior to the evaporation, sufficient acid is added to convert the diammonium phosphate, completely or for the most part, into monoammonium phosphate and ammonium nitrate, according to the equation:

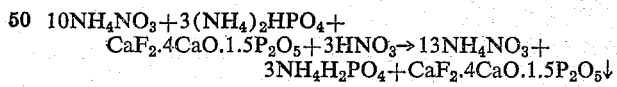

Hence, if the foregoing be correct, then, the process of the present invention should yield a fertilizer which, apart from approximately 21% total N (11.6% $NH_3$—N and 9.4% nitrate—N), contains 22% $P_2O_5$ which is almost completely "citrate-soluble," and half of which is "water-soluble." This has been confirmed in actual practice as will be seen from the following example:

Example 1,100 grams of Florida phosphate (50% CaO; 34.1% $P_2O_5$; 3.7% F) were decomposed with 2,200 grams 55% nitric acid. After complete decomposition, 1,180 grams $Ca(NO_3)_2$-4 aq. were separated by cooling.

The resulting liquor was then treated with 237 grams $NH_3$ at a pH of 6.7. By adding 140 grams 55% nitric acid, the pH of the neutralized mass was reduced to 4.0, after which the mass was evaporated at 145° C. The melt obtained was then granulated and finally dried in a rotary drier. 1,700 grams of end product were obtained, containing 20.1% N (11.4% $NH_3$—N and 8.7% $NO_3$—N) and 20% $P_2O_5$ (relative citrate-solubility 96%, relative water-solubility 49%).

Obviously, potassium salts can be added to the decomposition liquor to obtain an N.P.K.-fertilizer.

We claim:

1. A process for producing from fluorine-containing raw calcium phosphate a mixed fertilizer comprising nitrogen, calcium and phosphate, wherein the phosphate is substantially completely soluble in ammonium citrate and soluble to a large extent in water, comprising the steps of: treating the raw phosphate with nitric acid to produce an acid decomposition liquor; adjusting the molar $CaO/P_2O_5$ ratio of the liquor to a value not greater than 2; continuously neutralizing the thus adjusted liquor to a pH within the range of 6 to 7.5 by simultaneously introducing streams of the adjusted liquor and $NH_3$ into a contacting vessel; reducing the pH of the neutralized liquor to about 4, whereby the ammonium-citrate solubility of the contained phosphate is not appreciably lowered; evaporating the neutralized liquor of the reduced pH to obtain a melt; thereafter drying said melt, and recovering the dried melt which forms the above mentioned mixed fertilizer.

2. Process according to claim 1, wherein the pH of the neutralized liquor is reduced by the addition of nitric acid.

3. A granular mixed fertilizer containing nitrogen, calcium, phosphate and fluorine, said fertilizer produced from raw calcium phosphate by a process comprising the steps of: treating the raw phosphate with nitric acid to produce an acid decomposition liquor; adjusting the molar $CaO/P_2O_5$ ratio of the liquor to a value not greater than 2; continuously neutralizing the thus adjusted liquor to a pH within the range of 6 to 7.5 by simultaneously introducing streams of the adjusted liquor and $NH_3$ into a contacting vessel; reducing the pH of the neutralized liquor to about 4, whereby the ammonium-citrate solubility of the contained phosphate is not appreciably lowered; evaporating the neutralized liquor of the reduced pH to obtain a melt; thereafter drying said melt, and recovering the dried melt which forms the above mentioned mixed fertilizer and which contains a complex of calcium phosphate and $CaF_2$, wherein the phosphate is substantially completely soluble in ammonium citrate and soluble in water in excess of about 40%, and wherein the calcium phosphate after subtraction of $CaF_2$ shows a $CaO/P_2O_5$ ratio of about 2.65.

References Cited in the file of this patent

UNITED STATES PATENTS

| | | |
|---|---|---|
| 1,876,501 | Johnson | Sept. 6, 1932 |
| 2,061,191 | Foss et al. | Nov. 17, 1936 |
| 2,656,266 | Calmeyer | Oct. 20, 1953 |
| 2,707,676 | Picot et al. | May 3, 1955 |
| 2,726,949 | Andres et al. | Dec. 13, 1955 |
| 2,738,265 | Nielsson | Mar. 13, 1956 |
| 2,819,955 | Slot | Jan. 14, 1958 |